Figure 1:
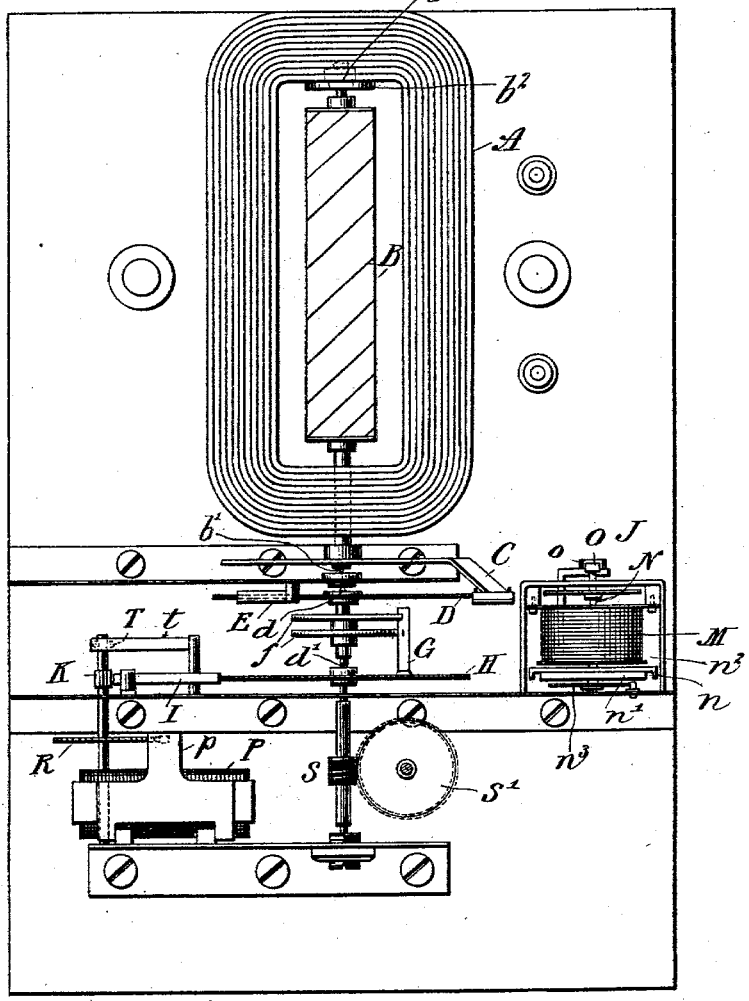

No. 720,981. PATENTED FEB. 17, 1903.
W. STANLEY.
APPARATUS FOR MEASURING THE ENERGY OF ELECTRIC CURRENTS.
APPLICATION FILED JULY 16, 1902.
NO MODEL. 3 SHEETS—SHEET 1.

Witnesses
Inventor:—
WILLIAM STANLEY,
By his Attorney

No. 720,981. PATENTED FEB. 17, 1903.
W. STANLEY.
APPARATUS FOR MEASURING THE ENERGY OF ELECTRIC CURRENTS.
APPLICATION FILED JULY 16, 1902.
NO MODEL. 3 SHEETS—SHEET 2.

Witnesses
Inventor:—
WILLIAM STANLEY,
By his Attorney

No. 720,981. PATENTED FEB. 17, 1903.
W. STANLEY.
APPARATUS FOR MEASURING THE ENERGY OF ELECTRIC CURRENTS.
APPLICATION FILED JULY 16, 1902.
NO MODEL. 3 SHEETS—SHEET 3.
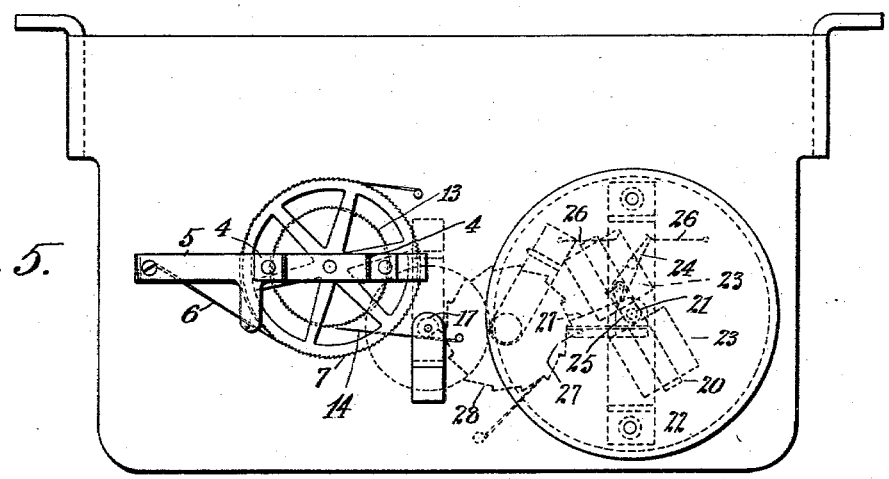
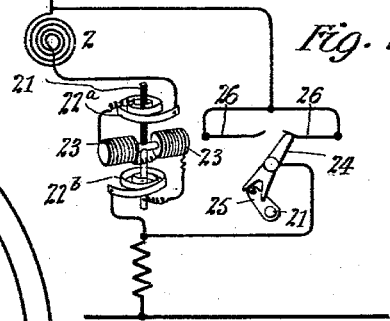
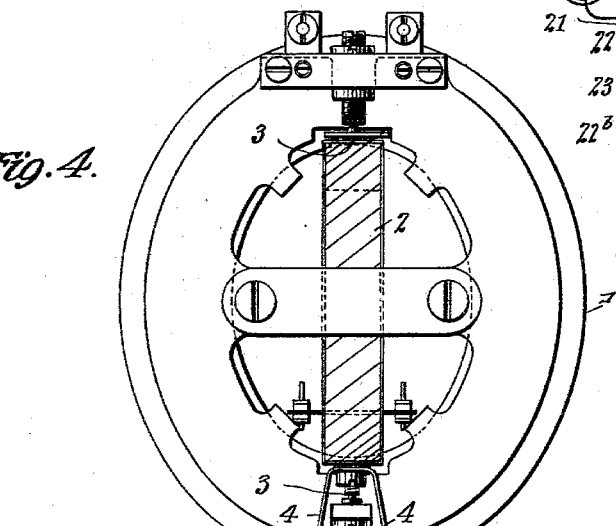
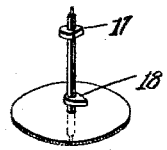
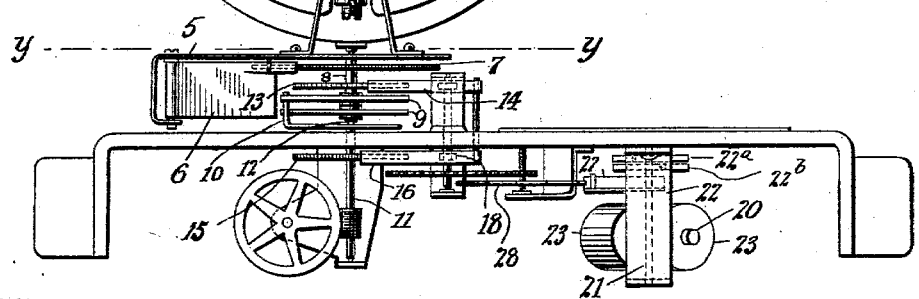
Witnesses
Inventor
WILLIAM STANLEY
By his Attorney

UNITED STATES PATENT OFFICE.

WILLIAM STANLEY, OF GREAT BARRINGTON, MASSACHUSETTS, ASSIGNOR TO STANLEY INSTRUMENT COMPANY, OF GREAT BARRINGTON, MASSACHUSETTS, A CORPORATION OF MASSACHUSETTS.

APPARATUS FOR MEASURING THE ENERGY OF ELECTRIC CURRENTS.

SPECIFICATION forming part of Letters Patent No. 720,981, dated February 17, 1903.

Application filed July 16, 1902. Serial No. 115,753. (No model.)

*To all whom it may concern:*

Be it known that I, WILLIAM STANLEY, a citizen of the United States, residing at Great Barrington, Berkshire county, Massachusetts, have invented certain new and useful Improvements in Apparatus for Measuring the Energy of Electric Currents, of which the following is a full, clear, and exact description.

My improvement relates to apparatus for measuring the energy of electric currents; and its object is to produce a simple and effective apparatus which shall be easy to manufacture and accurate in operation and fill a demand now existing for an inexpensive and efficient apparatus.

My invention particularly relates to that type of electrical measuring instruments in which a movable coil carrying a current is dynamically acted upon by the field of a nearby stationary coil, known in the art as an "electrodynamometer." In such instruments, as is well known, there is produced a torque of the movable coil exactly proportional to the electrical energy transmitted, and they are employed in the art to indicate, by the deflection of a suitable pointer, the value of the energy transmitted in the circuit to which they are connected, but are incapable of integrating the sum of such energy over any given time. In devices embodying my invention the dynamometer is used in connection with other devices, so that it shall automatically integrate the torque developed upon it, and consequently indicate by suitable registering devices the sum of the energy that has passed, expressing such sums in units of time.

The principal elements of the apparatus embodying my invention consist of, first, a time-beater or a device for accurately producing a given value of motion or given rotation of a wheel, for example, in a given time; second, an electrodynamometer or device for accurately expressing by its torque the value of energy transmitted through it from instant to instant; third, an integrating system or arrangement for accurately recording the sum of the torque values developed by the dynamometer in terms of time.

Thus, for example, the torque developed during a given period may have a value expressed by the length of a spring required to balance it and may therefore be expressed in inches. The number of such inches per hour would therefore represent the value of the energy transmitted per hour, and the term "inch-hours" would be equivalent to "watt-hours" multiplied by a constant.

My invention is embodied in a wattmeter, that being the kind of meter which is particularly desired, and consists of a device for indicating equal periods of time, means for measuring the energy consumed during these intervals, and means for integrating such measurements.

My invention is embodied in the apparatus shown in the accompanying drawings, in which—

Figure 2:
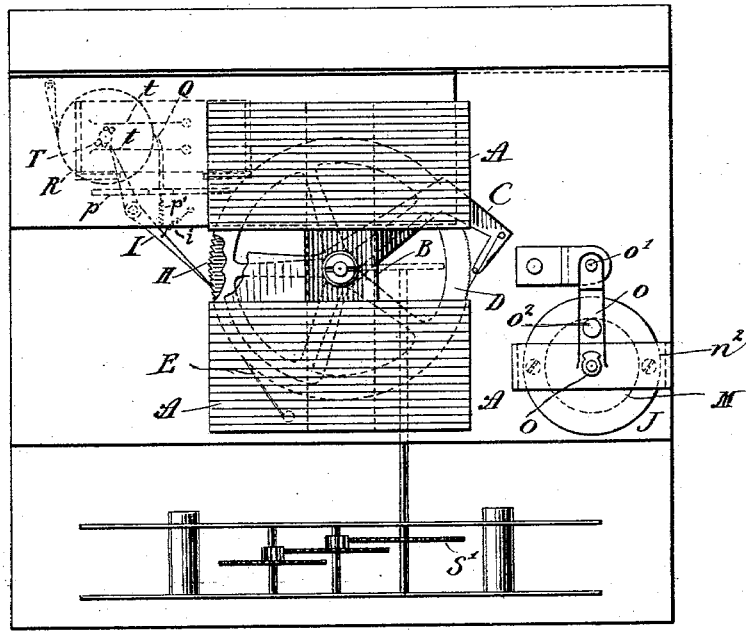
Figure 3:
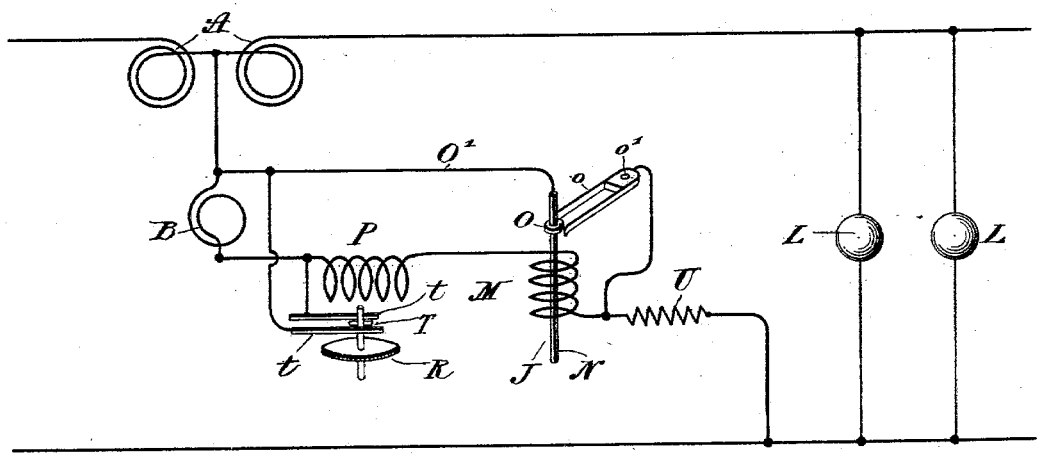

Figure 1 represents a front elevation of the meter. Fig. 2 is a plan view. Fig. 3 shows the circuits. Figs. 4 to 7 show a modification. Fig. 4 is a front elevation of the modified form. Fig. 5 is a horizontal section of the same on the line Y Y. Fig. 6 is a view of a detail. Fig. 7 is a diagram of the circuits.

Referring more particularly to the drawings, A is a series coil.

B is a shunt or pressure coil in parallel with the lamps L or other devices to which the current to be measured is supplied. This coil B is mounted in bearings $b$ $b'$, so as to swing slightly within the coil A, tending toward the zero position by reason of the spring $b^2$. To the lower end of the shaft of the coil B is attached a pawl C, which engages with ratchet-teeth on the wheel D, which is on a shaft journaled at $d$ $d'$. It is held from rotating in one direction by a pawl E. As the coil B swings back and forth the pawl C rotates the wheel D against the action of the coiled springs $f$, whose inner ends are attached to the shaft of the wheel D and whose outer ends are attached to a post G, mounted upon the wheel H. This wheel H has ratchet-teeth with which the pawl I, acted upon by the spring $i$, engages to hold it from rotation, except when it is periodically released. This periodic release is brought about by the time-beater J and the magnetically-operated trip K actuated thereby. The time-beater consists of a coil M, through which passes an iron shaft N, pivoted so as to swing freely.
$n$ is a bar of iron carried thereby, and $n'$ is a balance-wheel attached thereto, and $n^3$ is a coiled spring normally holding the bar $n$ slightly out of alinement with the iron frame $n^2$. To the top of the shaft N is attached a cam O, which, except when in substantially the position shown in Fig. 2, makes contact with the spring $o$. As the shaft swings, the cam O makes and breaks contact with the spring $o$, in the former instance shunting the current around the coil M and deënergizing it. When contact is broken, the coil M is energized, magnetizing the armature $n$ and giving it an impulse which keeps it and the shaft and cam connected therewith swinging with a regular beat. Whenever the cam O and spring $o$ make contact, the magnet P, which is in series with the coil M, is also short-circuited and deënergized. The cam O on each oscillation causes the spring $o$ to move slightly on its axis $o'$, with the result that the open-circuiting and consequent magnetization of the armature $n$ takes place during the latter part of each first half-oscillation. The making and breaking of the circuit $O'$ by the cam O and spring $o$ keeps the armature $p$ of the magnet P vibrating, the spring $p'$ acting to retract it. This armature carries a pawl Q, which engages with the toothed wheel R and causes it to rotate with the trip K, which twice during each revolution trips the pawl I and causes it to release the wheel H, which then swings around under the action of the springs $f$, causing the worm S carried thereby to operate the integrating-train S'. At the same time that the trip K releases the pawl I the bar T makes contact with the two spring-terminals $t\ t$, which short-circuits the coil B.

U is a resistance in the shunt-circuit.

When in operation, the time-beater J by opening and closing the circuit $O'$ maintains its own oscillation and by energizing and deënergizing the magnet P keeps its armature $p$ vibrating. It also keeps the coil B periodically energized and deënergized except when that coil is short-circuited by the bar T and springs $t\ t$. Whenever the lamps L L are in use, current flows through the coil A. As soon as this takes place the current in the coil B causes it to move or attempt to move the wheel D against the action of the springs $f$. The energizing and deënergizing of the coil B causes it to rotate the wheel D step by step until the opposing force of the springs $f$ becomes so great that the torque due to the currents in the coils A B is not sufficient to cause further movement against the springs $f$. Such a measurement resulting in the production of a counter torque in the spring equal to the dynamometer torque is exactly proportional to the energy in circuit. The wheel D is retained in its position by the pawl E, and when the pawl I releases the wheel H that wheel thereupon revolves under the action of the springs $f$, transmitting to the integrating-train S' a movement equal to that caused by the ratcheting of the wheel D, and thus producing an integration of the energy consumed during the period consisting of one half-revolution of the wheel R. During the time that the wheel H is revolving the coil B is deënergized, so as not to act upon the wheel D, this being brought about by the bar T making electric contact with the terminals $t\ t$.

Since the coils A and B are respectively series and shunt coils, it will be seen that the torque corresponding to the energy transmitted to the devices L is indicated at frequent intervals by the movement of the wheel D and that the movements of this wheel are periodically transmitted to the integrating-train S', resulting in an indication of the watt hours or energy consumed in the translating devices L. The apparatus, while simple, is remarkably effective and accurate and can be used to measure both alternating and continuous currents.

In the second form of meter the swinging dynamometer-coil winds up the spring and the time-beater armature-shaft mechanically actuates the means for marking the periods as distinguished from doing the same through an auxiliary period-marking magnet. Moreover, the swinging dynamometer-coil is controlled mechanically instead of electrically during the time that the integration is being made.

Referring now to Figs. 4 to 7, 1 is the series coil of a dynamometer, 2 being the shunt-coil, mounted to turn upon pivots 3 3. From the shunt-coil depend two arms 4 4, which engage a frame 5, carrying a ratchet 6, engaging with the toothed wheel 7. This wheel 7 is mounted upon the shaft 8 and carries two coiled springs 9, whose outer ends are connected to an arm 10, which is carried by a shaft 11. The shaft 8 has its lower bearing 12 on the upper end of the shaft 11. The shaft 8 carries a notched wheel 13, with which the pawl 14 engages. The pawl 14 is held out of contact with the wheel 13, except for a brief interval during which the pawl 16 is lifted from the wheel 15 on the shaft 11. The movements of these pawls are controlled by the cams 17 and 18, which in this form are mechanically actuated by the time-beater, the work being done when the time-beater is energized. The time-beater consists of an armature 20, mounted upon a swinging shaft 21 within an iron frame 22. The armature 20 is magnetized by the windings 23, which are magnetized and demagnetized by an automatic bridging arrangement, consisting of the arm 24, actuated by the pin 25 upon the end of the shaft 21, so as to engage the contacts 26 26 at all times except during the latter part of each half-oscillation, which connection shunts the current around the coils 23, as shown in the diagram Fig. 7. As the armature 20 oscillates the coils 23 23 are alternately magnetized and demagnetized, being magnetized only during the latter part of each half-oscillation, thereby giving to the armature an impulse opposed by the springs 22$^a$ 22$^b$, which tend to hold the armature slightly out of alinement with the frame 22, thus maintaining the armature in motion, the mechanism constituting a very accurate timekeeping device. The pawl 27, mounted on the shaft 21, engages with the wheel 28 when the time-beater is energized and performs its work at that time.

In the operation of the meter the time-beater not only short-circuits the current on its own windings 23 23, but also short-circuits the dynamometer-coil 2, with the result that the dynamometer-coil is alternately magnetized and demagnetized and magnetic impulses are set up corresponding in value to the torque due to the currents flowing through the dynamometer. As the dynamometer-coil 2 has impressed upon it these magnetic impulses, it will, so long as it is free to do so, oscillate slightly, its torque being proportional to the energy in the circuit, and the pawl 6, carried thereby, will ratchet up the wheel 7 against the springs 9. This ratcheting will continue until the reaction of the springs equals the torque of the dynamometer-coils, at which time it will stop. The time-beater, however, is operating continuously and its train, together with the cams 17 and 18, continues to move. At the end of each period of revolution of the cams 17 and 18 the pawl 14 is permitted to engage the wheel 13 and the pawl 16 is lifted out of engagement with the wheel 15. When this takes place, the shaft 11, carrying the wheel 15, is permitted to revolve under the action of the springs 9 and does revolve until the springs are entirely relaxed, the extent of movement being recorded upon the indicating-dial whose train is operated by the worm upon the shaft 11. During the time that the shaft 11 is being revolved by the action of the springs 9 the shaft 8 is held from revolving by the pawl 14, which operates to prevent the coil 2 from ratcheting up the wheel 7 during the interval that the springs 9 are unwinding. The cams 17 and 18 are so proportioned that as soon as the springs have been completely relaxed the pawl 16 is brought into engagement with the wheel 15, thereby restraining it from further movement, and the pawl 14 is lifted from engagement with the wheel 13, thereby permitting the shaft 8 again to be moved by the action of coil 2. This arrangement of parts is very simple and produces very accurate results, dispensing with the auxiliary magnet of the first form and doing away with manipulation of circuits at all points except at the time-beater.

Referring to the diagram shown in Fig. 7, it will be seen that the time-beater coil is in series with the shunt-coil of the dynamometer, so that the two are simultaneously energized and deënergized. In case an auxiliary ratcheting-magnet is used, as in the first form, it too is placed in series with these coils.

In both forms of meter there are definite separate periods of measurement and integration, the mechanism operating during an integration period to record an amount proportional to the torque developed upon the springs during the preceding measurement period.

The method disclosed in the above description is described and claimed in my copending application, Serial No. 115,815, filed July 16, 1902.

The apparatus shown in Figs. 1 to 3, inclusive, is specifically claimed in my copending application, Serial No. 113,084, filed June 25, 1902.

What I claim is—

1. In a meter, the combination of a series coil, a shunt-coil free to oscillate relatively thereto, a time-beater acting to cause said shunt-coil to oscillate and means operated thereby for integrating the torque due to the current in said shunt and series coils at the ends of periods, each embracing a number of such oscillations.

2. In a meter, the combination of a series coil, a shunt-coil free to oscillate relatively thereto, a time-beater, acting to energize and deënergize said shunt-coil and means for integrating periodically the torque due to the currents in said shunt and series coils.

3. In a meter, the combination of a series coil, a shunt-coil free to oscillate relatively thereto, a time-beater having an exciting-coil and means for making and breaking a shunt-circuit around said shunt and exciting coils, and means for integrating the torque, due to, the currents in said shunt and series coils, at the ends of periods embracing a number of such makes and breaks.

4. In a meter, the combination of a series coil, a shunt-coil free to oscillate relatively thereto, a time-beater having an exciting-coil in series with said shunt-coil, and means for making and breaking a shunt-circuit around said shunt and exciting coils and means for periodically integrating the torque due to the current in said shunt and series coils.

5. In a meter, the combination of a series coil, a shunt-coil free to move relatively thereto, a wheel restrained by springs and actuated by said shunt-coil, a second wheel actuated by said springs and means for periodically releasing said second wheel and an integrating-train for integrating its movement and means for preventing the action of the shunt-coil during the period of integration.

6. In a meter, the combination of a series coil and a shunt-coil, means for periodically producing between said coils a torque corresponding to the energy in the current used, the pawl 6, wheel 7, springs 9, wheel 15, and means for periodically releasing the wheel 15 and an integrating-train for integrating its movement.

7. In a wattmeter, the combination of a dynamometer having a fixed and an oscillating coil, the forward movements of said oscillating coil depending on the value of the energy in the circuit, an integrating-train operated by the forward movements of said oscillating coil, and means for communicating the forward movements of said coil to said train at the end of equal periods embracing a number of oscillations of said oscillating coil so as to show by its indications the watt-hours consumed in the circuit.

8. In a meter, a dynamometer, a ratcheting device controlled by the torque of said dynamometer, period-marking means, an integrating device actuated by said ratcheting device through an intermediate spring, and stops controlled through said period-marking means for restraining and releasing said ratcheting device and train alternately.

9. In a meter, an integrating system, a spring connected therewith, a dynamometer-controlled system connected to said spring and impressing on said spring a torque proportional to the energy of the circuit, and means for releasing and restraining the systems connected to said spring alternately.

10. In a meter, an integrating system, a spring connected therewith at one end, an actuating dynamometer-controlled system connected to the other end of said spring and impressing on said spring by a series of movements a torque proportional to the energy of the circuit, and means for mechanically releasing and restraining the systems connected to said spring alternately.

11. In a meter, a dynamometer, a ratcheting-pawl controlled by the torque of said dynamometer, a continuously-oscillating member indirectly actuating said ratcheting-pawl, and constituting part of a period-marking device, an indicating-train actuated by said ratcheting-pawl through an intermediate spring, and stops controlled mechanically by said oscillating member for alternately restraining and releasing said ratcheting device and train at the end of each period.

12. In a meter having separate measuring and integrating periods, the combination of a dynamometer, means for impressing upon a spring step by step a force proportional to the torque of said dynamometer during a measuring period, and means operated by said spring for integrating during a succeeding integrating period an amount proportional to this torque.

13. In a meter having separate measuring and integrating periods, the combination of a dynamometer, means for impressing upon a spring by a series of impulses a force proportional to the torque of said dynamometer during a measuring period, means operated by said spring for integrating during a succeeding integrating period an amount proportional to this torque, and a time-beating mechanism marking off said measuring and integrating periods.

14. In a meter, the combination of a series coil, a shunt-coil free to oscillate relatively thereto, means for producing magnetic impulses therein, a torque-indicator, and means for integrating the indications of said torque-indicator at the end of equal periods embracing a number of oscillations of said shunt-coil.

15. A device having a fixed period of oscillation consisting of a stationary member and a relatively movable member forming parts of a magnetic circuit, windings for magnetizing the same carried by said movable member, a circuit therefor, two terminals connected to one side of said winding and a lever connected to the other side and means operated by said movable member for causing said lever to make and break contact with said terminals alternately and a spring opposing the movement due to the impulse received when contact is broken.

WILLIAM STANLEY.

Witnesses:
H. C. TUXBURY,
J. F. HOWES, Jr.